(12) United States Patent
Li et al.

(10) Patent No.: US 11,782,523 B2
(45) Date of Patent: Oct. 10, 2023

(54) METHOD FOR CONTROLLING INTERNET OF THINGS DEVICE, AND TERMINAL DEVICE

(71) Applicants: BEIJING XIAOMI MOBILE SOFTWARE CO., LTD., Beijing (CN); BEIJING XIAOMI PINECONE ELECTRONICS CO., LTD., Beijing (CN)

(72) Inventors: Yaming Li, Beijing (CN); Jianxing Zhao, Beijing (CN); Ying Yao, Beijing (CN); Haitao Yuan, Beijing (CN); Kangxi Tan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/461,462

(22) Filed: Aug. 30, 2021

(65) Prior Publication Data

US 2022/0300096 A1 Sep. 22, 2022

(30) Foreign Application Priority Data

Mar. 17, 2021 (CN) .......................... 202110289792.9

(51) Int. Cl.
*G06F 3/0354* (2013.01)
*H04W 76/10* (2018.01)
(Continued)

(52) U.S. Cl.
CPC .......... *G06F 3/03543* (2013.01); *G06F 3/038* (2013.01); *H04W 76/10* (2018.02);
(Continued)

(58) Field of Classification Search
CPC ................. G06F 3/03543; G06F 3/038; G06F 2203/0384; G16Y 40/50; H04W 76/10; H04W 4/80; H04W 4/06
See application file for complete search history.

(56) References Cited

U.S. PATENT DOCUMENTS

| 2004/0189592 A1* | 9/2004 | Prabhakaran ........... G06F 3/038 345/156 |
| 2005/0078087 A1* | 4/2005 | Gates .................... G06F 3/0383 345/163 |

(Continued)

FOREIGN PATENT DOCUMENTS

| CN | 203520611 U | 4/2014 |
| CN | 208188794 U | 12/2018 |

(Continued)

OTHER PUBLICATIONS

Chinese Patent Application 202110289792.9, Office Action dated Dec. 30, 2021, 4 pages.

(Continued)

*Primary Examiner* — Ariel A Balaoing
(74) *Attorney, Agent, or Firm* — COZEN O'CONNOR (57) ABSTRACT

Disclosed are a method for controlling an Internet of Things (IoT) device, and a terminal device. The method is applied to a terminal device and includes: acquiring parameter information of a triggered key of a mouse; determining a target device and target operation information acting on the target device based on the parameter information; and sending device information of the target device and the target operation information to a server.

9 Claims, 8 Drawing Sheets

(51) Int. Cl.
*G06F 3/038* (2013.01)
*H04W 4/80* (2018.01)
*G16Y 40/50* (2020.01)
*H04W 4/06* (2009.01)

(52) U.S. Cl.
CPC ...... *G06F 2203/0384* (2013.01); *G16Y 40/50* (2020.01); *H04W 4/06* (2013.01); *H04W 4/80* (2018.02)

(56) References Cited

U.S. PATENT DOCUMENTS

| | | | | |
|---|---|---|---|---|
| 2007/0011446 | A1* | 1/2007 | Kato | H04L 63/08 |
| | | | | 713/150 |
| 2017/0147089 | A1* | 5/2017 | Liang | G06F 3/0346 |
| 2019/0013018 | A1* | 1/2019 | Rekstad | G06F 3/017 |
| 2019/0028997 | A1* | 1/2019 | Inoue | H04W 68/12 |
| 2021/0263600 | A1* | 8/2021 | Starrett | G06F 3/04845 |
| 2022/0208319 | A1* | 6/2022 | Ansari | H04L 63/08 |

FOREIGN PATENT DOCUMENTS

| | | |
|---|---|---|
| CN | 111770208 A | 10/2020 |
| JP | H11262073 A | 9/1999 |
| WO | WO 2017138999 A1 | 8/2017 |

OTHER PUBLICATIONS

Chinese Patent Application 202110289792.9, English translation of Office Action dated Dec. 30, 2021, 5 pages.
European Patent Application 21205441.5, Search and Opinion dated Aug. 4, 2022, 12 pages.

* cited by examiner

METHOD FOR CONTROLLING INTERNET OF THINGS DEVICE, AND TERMINAL DEVICE

CROSS-REFERENCE TO RELATED APPLICATION

The present application is based upon and claims priority to Chinese Patent Application No. 202110289792.9, filed on Mar. 17, 2021, the entirety contents of which are incorporated herein by reference.

TECHNICAL FIELD

The present disclosure relates to the technical field of Internet of Things, and more particularly, to a method for controlling an Internet of Things (IoT) device, and a terminal device.

BACKGROUND

At present, as an external input device for computers, the mouse is mainly used in an office setting. The basic functions of the mouse are also reflected in the text input, translation and other functions. The mouse key functions are often simple and users cannot customize the mouse key functions. The mouse, as an accessory of the computer, will lose most of its functions when it is separated from the computer.

SUMMARY

Embodiments of the present disclosure provide a method for controlling an Internet of Things (IoT) device. In one embodiment, the method is applied to a terminal device and includes: acquiring parameter information of a triggered key of a mouse, in which the parameter information includes a key value of the key and a state of the key; determining a target device and target operation information acting on the target device based on the parameter information; and sending device information of the target device and the target operation information to a server.

Embodiments of the present disclosure provide a method for controlling Internet of Things (IoT) device. In one embodiment, the method is applied to a mouse and includes: acquiring device information of a local device in a communication state; determining a working mode based on the device information of the local device; and sending control information to the local device based on an operation on a key and the working mode.

Embodiments of the present disclosure provide a terminal device. In one embodiment, the terminal device includes: a processor; a memory for storing instructions executable by the processor; in which the processor is configured to: acquire parameter information of a triggered key of a mouse, in which the parameter information includes a key value of the key and a state of the key; determine a target device and target operation information acting on the target device based on the parameter information; and send device information of the target device and the target operation information to a server.

It should be understood that the above general description and the following detailed description are only exemplary and explanatory, and do not limit the present disclosure.

BRIEF DESCRIPTION OF THE DRAWINGS

The drawings herein are incorporated into the specification and constitute a portion of the specification and illustrate embodiments in accordance with the disclosure, and the drawings together with the specification are used to explain the principle of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The Internet of Things (TOT) is in a meaning of Internet for connecting everything, which is an extended and expanded network based on the Internet. It is a huge network formed by combining various information sensing devices with the Internet, realizing an interconnection among individuals, machines and things at any time and any place. With the continuous development of information technology, IoT devices have been increasingly used.

At present, users usually use a dedicated IoT controller to control IoT devices. An IoT controller may only control a specific device and cannot flexibly set objects to be controlled. The users can also use a mobile phone to directly control the IoT home devices. This method requires opening special application on the mobile phone, then selecting a device and selecting an operation to be performed. The operation chain is redundant which causes a poor user experience.

The mouse is a commonly used product in daily office. In the home environment, the mouse is also a common device. In the past, the mouse was mainly used in the office field. As an accessory of the computer, the mouse will lose most of its functions after being separated from the computer. As people use IoT devices, the basic functions of the mouse can no longer meet daily requirements for individuals.

In order to solve the above technical problems, the present disclosure provides a method for controlling an Internet of Things (IoT) device, which is applied to a terminal device. The terminal device acquires parameter information of a triggered key of a mouse, determines a target device and target operation information acting on the target device based on the parameter information, and sends device information of the target device and the target operation information to a server, such that the server sends control information sent by the user through the mouse to the target device. therefore, an effect that the user remotely controls the IoT device through the mouse may be achieved, which improves the additional value of the mouse key, has various functions, improves the user's use experience, and meets the user's use needs.

According to an exemplary embodiment, a method for controlling an Internet of Things (IoT) device is provided, which is applied to a terminal device. The terminal device may be, for example, a desktop computer, a notebook computer, a mobile phone, a tablet computer, and other smart devices. Before describing the method in this embodiment, the overall architecture involved in the method will be explained first.

Figure 1:
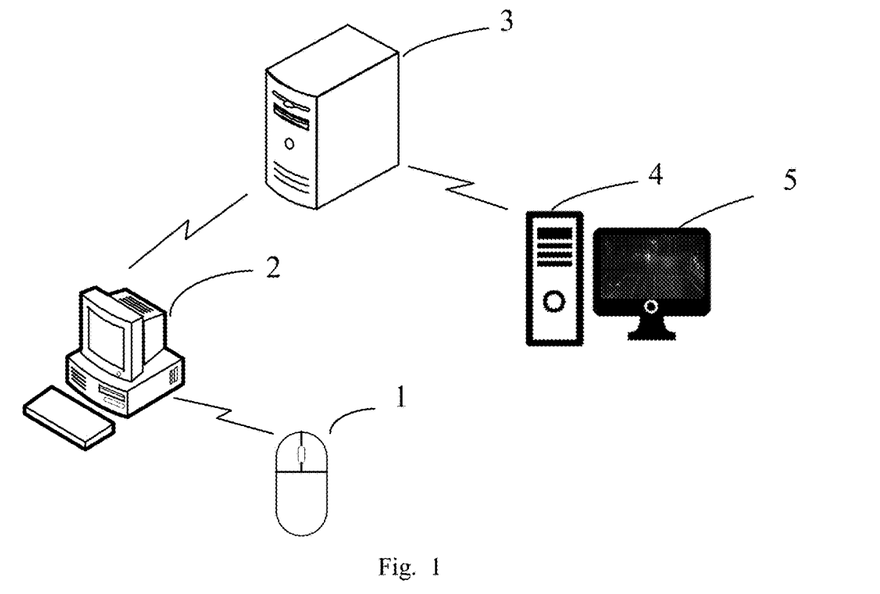
FIG. 1 is a diagram showing a communication network architecture for controlling networked devices with a method for controlling an Internet of Things (IoT) device according to an exemplary embodiment.

As shown in FIG. 1, the communication network architecture includes a mouse 1, a terminal device 2, a server 3, and an Internet of Things (IoT) device. The mouse 1 is in communication connection with the terminal device 2, the terminal device 2 is connected to the server 3 via a wireless network, and the IoT device is connected to the server 3 via a wireless network. The IoT device may be, for example, an air conditioning device 4 and a TV set 5. It should be understandable that the IoT device may also be smart home devices such as smart curtains and smart refrigerators. The terminal device 2 and the mouse 1 in this embodiment may be devices in the user's office, or devices located in other enclosed spaces away from the IoT devices. The execution subject of the method for controlling the IoT device in this embodiment is the terminal device 2. The terminal device 2 may include, but is not limited to, a smart phone, a tablet computer, a personal computer (PC), a notebook computer, a personal digital assistant (PDA), and so on.

In this embodiment, the IoT device in the Internet may be called a networked device, and the IoT device in the local communication network may be called a non-networked device. Referring to FIG. 1, the IoT device may be connected to the Internet, that is, the networked devices. When the user wants to control the networked device, as the mouse cannot establish wireless communication with the IoT device in the Internet, at this time, the user may trigger a key of the mouse 1 to send a message to the terminal device 2, and the terminal device 2 determines the IoT device corresponding to the message and the related operation content which are then sent to the server 3 according to the message sent by mouse 1. After receiving the above information, the server 3 controls the involved IoT device to perform the related operation content.

Figure 2:
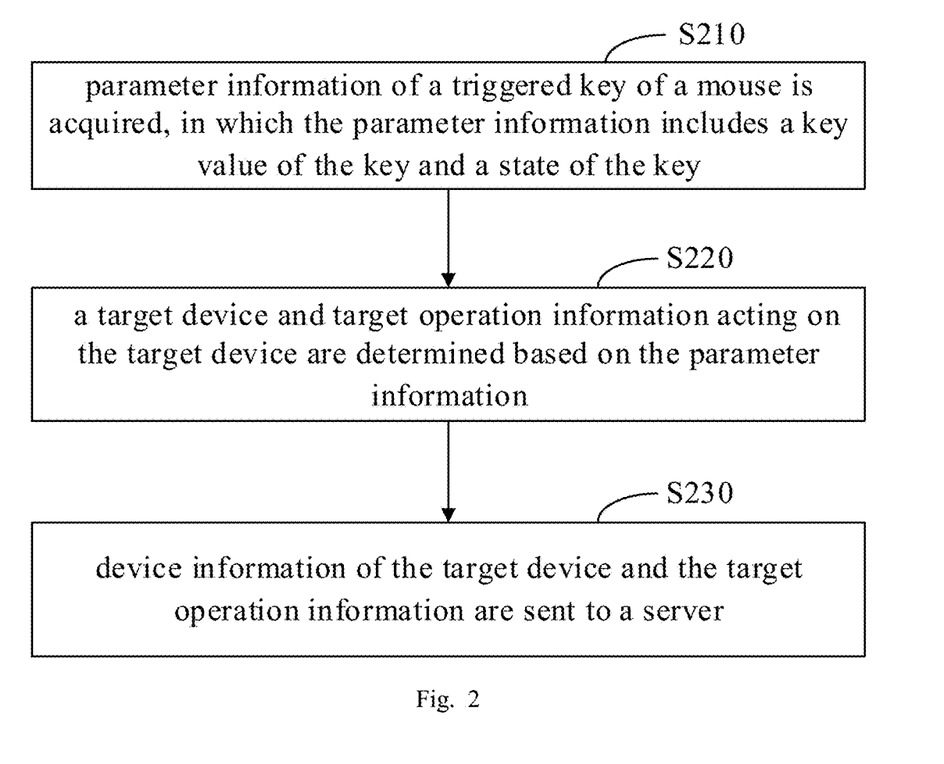
FIG. 2 is a flowchart showing a method of controlling an Internet of Things (IoT) device according to an exemplary embodiment.

As shown in FIG. 2, the method in this embodiment includes the following steps during the implementation process.

In step S210, parameter information of a triggered key of a mouse is acquired, in which the parameter information includes a key value of the key and a state of the key.

In this step, the terminal device can receive all key operations sent by the mouse. Each key on the mouse corresponds to a key value. For example, the key value corresponding to the left key is A, the key value corresponding to the right key is B, and the key value corresponding to the middle key is C; the state of the key may be, for example, single-click, double-click, long-press, and so on. When the user presses a certain key of the mouse, the key value of the key and the specific operation that the user acts on the key, that is, the state of the key, will be sent to the terminal device as parameter information. After the terminal device receives the parameter information sent by the mouse, the terminal device subsequently determines the device that the user wants to operate and the operation content according to the parameter information (details are described later).

In an example, the user triggering the parameter information sent by the mouse key includes: pressing the mouse key in a preset sequence of operation actions. Specifically, the user can trigger a mouse key by pressing a preset operation action, and the preset operation action includes one or a combination of the followings: single-click, double-click, long-press, a combination of different keys. For example, the user can trigger the keys by clicking the left key once, or by clicking the right key twice in a sequence of execution. For another example, the user can also trigger a key by clicking the left key and the right key of the mouse at the same time. For another example, the user can also trigger a key by long pressing the middle key of the mouse.

In another example, a voice control key can also be specially set on the mouse to realize voice information entry. The voice control key corresponds to a preset key value. When the voice control key is pressed, the mouse will collect voice information, and the collected voice information can be regarded as the state of the key corresponding to the voice control key. For example, the user presses the voice control key on the mouse and says "Please turn on the air conditioner at home and adjust the temperature to 25° C.". After the mouse receives the voice information, the voice control key being triggered and the received voice information may be determined as parameter information and sent to the terminal device, and then the terminal device recognizes the voice information according to the received parameter information to determine the IoT device and the corresponding operation content involved in the voice information made by the user, so as to achieve a remote control for the IoT device via the mouse.

Here, it should be noted that in this embodiment, the terminal device 2 and the mouse 1 can be connected in a near field communication manner, such as Bluetooth. When the mouse 1 has a network communication function, it may also be connected through Internet communication. When the terminal device 2 is a personal computer, the terminal device 2 is provided with software that matches the mouse 1 to adjust the IoT devices corresponding to the respective keys on the mouse 1 and the operation content corresponding to operations acting on the keys by setting the software. When the terminal device 2 is a mobile phone or a tablet computer, an application program (APP) is set on the terminal device 2. By operating and setting the APP, the IoT devices corresponding to the respective keys on the mouse 1 and the operation content corresponding to the operations acting on the keys may be adjusted.

In step S220, a target device and target operation information acting on the target device are determined based on the parameter information.

In this step, after the terminal device obtains the parameter information sent by the user by triggering the mouse, the terminal device determines the target device corresponding to the parameter information and the target operation information sent for the target device according to the parameter information sent by the mouse.

In an example, referring to FIG. 1, two IoT devices are connected to the Internet, one is an air conditioner 4 and the other is a TV set 5. When the user is in the office, and the user wants to turn on the air conditioner 4 at home, the user can click the left key of the mouse 1, and the terminal device 2 maintains a near field communication connection with the mouse 1, and the terminal device 2 receives the parameter information sent by the mouse 1, and specifically, the parameter information may include the key value of the left key and the state of the left key being clicked. The terminal device 2 may determine that the IoT device that the user wants to operate is the air conditioner 4, and the target operation information is to activate the air conditioner 4 according to the default rules between the terminal device 2 and the mouse 1, for example, the left key corresponds to "air conditioner 4", and the single-click corresponds to "turn on".

In another example, when the user is in the office and the user wants to turn off the TV set 5 at home, the user can double-click the right key of the mouse 1, the terminal device 2 maintains a Bluetooth communication connection with the mouse 1, and the terminal device 2 receives the parameter information sent by the mouse 1. The parameter information of the right key is the key value of the right key and the state of the right key being double-clicked. The terminal device 2 may determine that the IoT device that the user wants to operate is the TV set 5, and the target operation information is to deactivate the TV set 5 according to the default rules between the terminal device 2 and the mouse 1, for example, the right key corresponds to "TV set 5", and the double-click corresponds to "turn off".

In another example, when the user is in the office, and the user wants to turn on the air conditioner 4 at home, the user can long-press the middle key of the mouse 1 and says "Please turn on the air conditioner to 25° C." by voice while the middle key is pressed. The terminal device 2 maintains a Bluetooth communication connection with the mouse 1, and the terminal device 2 receives the parameter information sent by the mouse 1, the parameter information may include the key value of the middle key and the voice information received during the middle key is pressed. The terminal device 2 receives the voice information sent by the mouse 1 according to the default rules between the terminal device 2 and the mouse 1, such as a voice input state corresponding to the middle key. Furthermore, the terminal device 2 recognizes the received voice information, determines that the target device is the air conditioner 4, and the target operation information is to turn on the air conditioner to 25° C.

In step S230, device information of the target device and the target operation information are sent to a server.

In this step, the terminal device determines the target device that the user wants to control according to the parameter information of the key triggered by the user, and then determines the device information of the target device, such as the identification information of the target device, and determines the device information of the target device. The device information of the target device and the target operation information of the target device are sent to the server to control the target device to perform operations corresponding to the target operation information through the server, thereby realizing to control the networked device by the mouse through the network.

Referring to FIG. 1, the terminal device 2 determines that the user wants to control the air conditioner 4 in the home, the target operation information sent to the air conditioner 4 is turning on the air conditioner 4, and the terminal device 2 determines the device information of the air conditioner 4, such as version information of a certain air conditioner in the some air conditioners at home, and the device information of the air conditioner 4 and the target operation information of turning on the air conditioner 4 are sent to the server 3 and then sent to the air conditioner 4 through the server 3, such that the air conditioner 4 performs the corresponding operations.

The terminal device in the present disclosure obtains the parameter information of the mouse key triggered by the user, in which the parameter information includes the key value of the key and the state of the key, the target device that the user wants to control and the target operation information of the target device are determined according to the parameter information, and the device information of the target device and the target operation information of the target device are sent to the server, so that the server sends the control information sent by the user to the target device, thereby realizing remote control of different IoT devices through the mouse, improving the additional value of the mouse key, making the functions richer, improving the user experience, and meeting the user's use needs, which can realize the smart mouse in a true sense.

Figure 3:
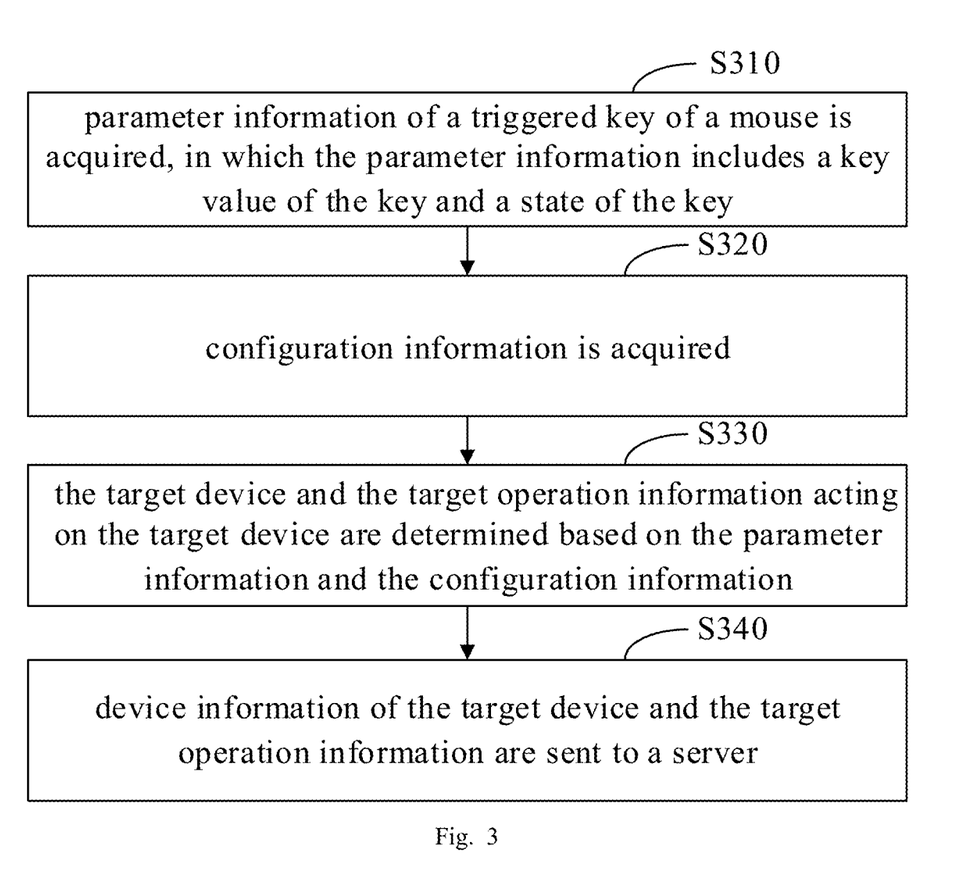
FIG. 3 is a flowchart showing a method of controlling an Internet of Things (IoT) device according to an exemplary embodiment.

According to an exemplary embodiment, as shown in FIG. 3, the method in this embodiment is applied to a terminal device. The method in this embodiment includes the following steps.

In step S310, parameter information of a triggered key of a mouse is acquired, in which the parameter information includes a key value of the key and a state of the key.

The step S310 is the same as the step S210, related descriptions are mentioned in step S210, which will not be repeated in this embodiment.

In step S320, configuration information is acquired.

The configuration information in this step is configured to represent a correspondence between the key value of the key and the IoT device and a correspondence between the state of the key and operation information.

The configuration information is pre-stored in the terminal device, and the related content in the configuration information can be modified by the software or APP installed on the terminal device, so that the user can customize the IoT device corresponding to the mouse key and the operation corresponding to the state of the mouse key as required, so as to meet the needs of users.

Of course, it should be understood that the configuration information can also be stored on the server, and the configuration information can be obtained from the server that is in communication with the terminal device when the terminal device needs to use the configuration information.

In step S330, the target device and the target operation information acting on the target device are determined based on the parameter information and the configuration information.

The configuration information of the terminal device stores the key value of the mouse key and the operation information corresponding to the pressed state of the mouse key. In the configuration information, the correspondence between the key value of the key triggered by the user and the IoT device, and the correspondence between the state of the key triggered by the user and the operation information can be obtained, such that the IoT device that the user wants to operate and the operation to be performed on IoT device may be determined. After the terminal device obtains the parameter information of the triggered mouse key, the terminal device determines the key value of the key and the state of the key contained in the parameter information. For example, the key value is A, and the state is single click. The terminal device queries the configuration information and determines that the target device corresponding to the key value A is an air conditioner, and the state of the key is that the target operation information corresponding to single-click is "turn on", that is, the air conditioner is turned on.

In step S340, device information of the target device and the target operation information are sent to a server.

The step S340 is the same as the step S230, and the related descriptions are mentioned in step S230, which will not be repeated in this embodiment.

In this embodiment, configuration information is stored in the terminal device. When the terminal device receives the parameter information sent by the mouse, the terminal device determines the target device and target operation information according to the configuration information and parameter information, and then the device information and target operation information are sent to the server so as to realize to control the device and remote control of the IoT device.

Figure 4:
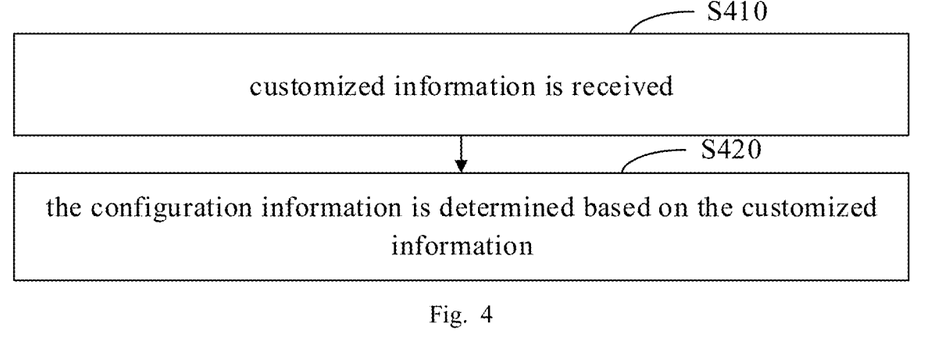
FIG. 4 is a flowchart showing a method of controlling an Internet of Things (IoT) device according to an exemplary embodiment.

According to an exemplary embodiment, as shown in FIG. 4, the method in this embodiment is applied to a terminal device. The method in this embodiment includes the following steps.

In step S410, customized information is received.

The customized information includes device information of the IoT device corresponding to the key value of the key, and operation information of the IoT device corresponding to the state of the key.

In this step, the mouse supports the user to configure the mouse keys through customized information. The user can preset the function of the mouse key to control the IoT device in the configuration page of the terminal device. The user can configure different key operations for the respective keys of the mouse according to their own situation, so as to control different IoT devices. For example, the user can input the customized information of the mouse in the editable software of the computer or the APP of the mobile phone. The user can set customized information about the mouse keys in the configuration page of the terminal device. The terminal device receives the customized information input by the user, and can flexibly configure the mouse key functions according to the customized information to add new mouse functions.

The user can set the correspondence between the key value of the mouse key and the IoT device in the Internet when the user wants to control the networked device via the mouse, and set the correspondence between the state of the mouse key and the operation information that acts on the networked device in the configuration page.

Referring to FIG. 1, the terminal device 2 can obtain the device information of all networked devices, that is, the terminal device 2 can obtain the device information of the air conditioner 4 in the home and the device information of the TV set 5 in the home through the server 3, and the terminal device 2 can also obtain information of all keys of the mouse. The correspondence between the preset key value of the key and the device information of the air conditioner 4 and the correspondence between the preset state of the key and the operation information for controlling the air conditioner 4 in the configuration page of the terminal device 2 according to personal usage habits when the user wants to control the air conditioner 4 at home.

The IoT devices in the present disclosure include, but are not limited to, smart devices such as smart household appliance and smart wearable devices. The smart wearable devices include smart wearable devices for elders, smart wearable devices for pets, smart watches for adults, smart watches for children, etc. the smart household appliances include smart air purifier platforms, sweeping robots, smart power strips, smart kitchen and bathroom supplies, smart doors and windows, air conditioners, washing machines, TVs, refrigerators, etc.

In an exemplary embodiment, the device information of the IoT device includes at least one of the following information: a device name, device identification information, a device address, a device interface, an IP address, a MAC address, and a communication identification.

In an exemplary embodiment, the operation information acting on the IoT device includes at least one of the following information: switch status control, volume adjustment, light brightness adjustment, and temperature adjustment.

In step 420, the configuration information is determined based on the customized information.

In this step, after the user sets the customized information of the mouse through the terminal device, the terminal device generates the configuration information of the mouse according to the correspondence between the key value of the key and the device information of the IoT device, and the correspondence between the state of the key and the operation information acting on the IoT device set in the customized information input by the user, and store the configuration information of the mouse or upload the configuration information to the server.

In this embodiment, the user can set the customized information of the respective mouse keys in the terminal device according to personal needs. The terminal device receives the customized information input by the user and generates configuration information, so that the mouse can perform the configurations based on the user's personal habits and needs to enrich the functions of the mouse keys, thereby meeting the user's personalized customization needs, and facilitating users to use the mouse to control the IoT devices according to their personal habits.

Figure 5:
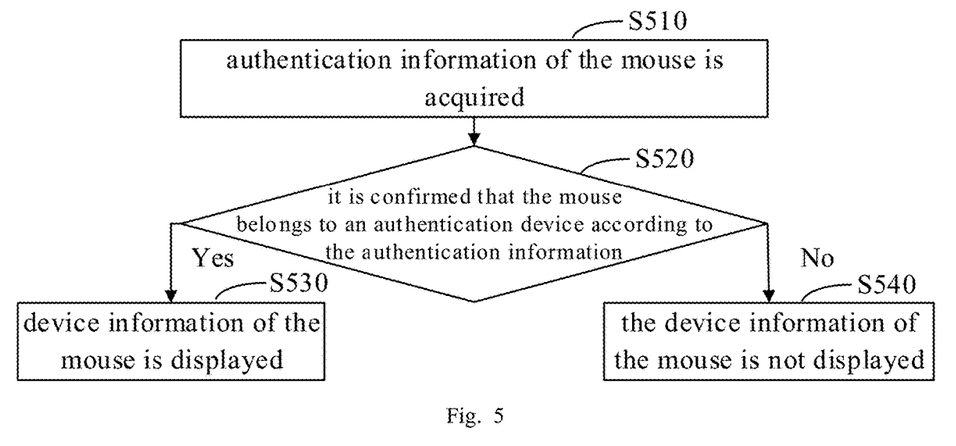
FIG. 5 is a flowchart showing a method of controlling an Internet of Things (IoT) device according to an exemplary embodiment.

According to an exemplary embodiment, as shown in FIG. 5, the method in this embodiment is applied to a terminal device. Before setting the customized information through the terminal device, and before controlling the IoT device through the mouse, the terminal device first needs to perform security authentication on the mouse to improve the security and reliability of subsequent operations. The method for authenticating a mouse involved in this embodiment includes the following steps.

In step S510, authentication information of the mouse is acquired.

In this step, before acquiring the authentication information of the mouse, the terminal device establishes a communication connection with the mouse in the near field communication manner. During the establishment of the communication connection, in order to ensure the reliability of the subsequent communication process, the first step is to obtain the authentication information of the mouse according to the preset communication protocol to perform device authentication on the mouse, and determine whether the mouse connected to the terminal device is an authentication device.

In step S520, it is confirmed that the mouse belongs to an authentication device according to the authentication information.

In a case that the mouse belongs to the authentication device, the step S530 is executed; in case that the mouse does not belong to the authentication device, the step S540 is executed.

When confirming whether the mouse belongs to an authentication device, the authentication information obtained from the mouse is compared with the pre-stored related information. In a case that the authentication information is consistent with the pre-stored related information, the mouse belongs to the authentication device. In a case that there is a difference between the pre-stored related information and authentication information, that is, they are inconsistent, the mouse is not an authentication device.

In step S530, device information of the mouse is displayed.

In this step, when the terminal device confirms that the mouse belongs to the authentication device, the device information of the mouse can be displayed in the terminal device, and the user can view the device information of the mouse and learn about the device details of the mouse in time.

The device information of the mouse includes one or more of the following combinations: an electric power of the mouse, version information, a state of the mouse, and mouse key information.

In step S540, the device information of the mouse is not displayed.

In this step, when the terminal device confirms that the mouse is not an authentication device, the device information of the mouse cannot be viewed in the terminal device, and the terminal device does not establish a communication connection with the mouse.

In this embodiment, the terminal device obtains the authentication information of the mouse to perform device authentication on the mouse, and judges whether the mouse belongs to the authentication device according to the authentication information of the mouse. In a case that the mouse belongs to the authentication device, the authentication for the mouse is passed, and the terminal device can display the device information of the mouse, such that the user can learn about the mouse information, and at the same time the reliability of the connection between the mouse and the terminal device may be improved.

According to an exemplary embodiment, the overall architecture in this embodiment is shown in FIG. 1, and the method for controlling an Internet of Things (IoT) device in this embodiment is applied to a server. The overall architecture shown in FIG. 1 is described in the description in the related embodiments, which will not be repeated here.

Figure 6:
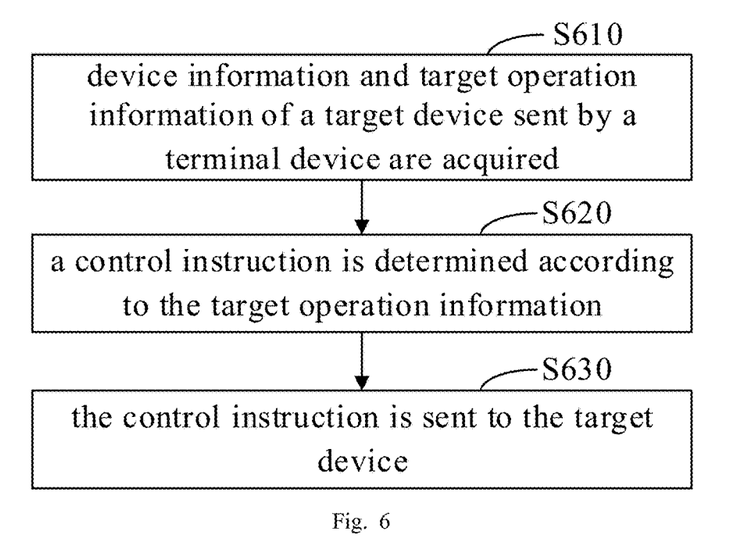
FIG. 6 is a flowchart showing a method of controlling an Internet of Things (IoT) device according to an exemplary embodiment.

As shown in FIG. 6, the method for controlling the Internet of Things (IoT) device in this embodiment includes the following steps.

In step S610, device information and target operation information of a target device sent by a terminal device are acquired.

In this step, the server receives the device information and target operation information of the target device sent by the terminal device, and determines the target device the user would like to control from the multiple networked IoT devices according to the received device information and target operation information of the target device, so that the server sends to the target device a control instruction issued by the user to the target device. Referring to FIG. 1, for example, if the user wants to control the air conditioner 4 in the home to be turned on, the user clicks the left key of the mouse 1 to send parameter information to the terminal device 2. After the terminal device 2 receives the parameter information sent by the mouse 1, the terminal device may determine, according to the parameter information, that the target device corresponding to the left key of the mouse 1 is the air conditioning device 4, and the corresponding target operation information is turn on, then the device information of the air conditioner 4 and the information of turning on the air conditioner are sent to the server 3.

In step S620, a control instruction is determined according to the target operation information.

In this step, after receiving the target operation information sent by the terminal device, the server determines the control instruction corresponding to the target operation information according to the target operation information. For example, after receiving the device information and the information of turning on the air conditioner sent by the terminal device, the control instruction is "turning on".

In step S630, the control instruction is sent to the target device.

In this step, after determining the control instruction according to the target operation information received from the terminal device, the server sends the control instruction to the target device that the user needs to control, so that the target device receives the control instruction and executes the corresponding operation. For example, the server 3 issues an instruction of "turning on" to the air conditioner 4 in the home, and controls the air conditioner 4 in the home to be turned on. For another example, the server 3 sends an instruction of "turning off" to the TV set 5 in the home to control the TV set 5 in the home to be turned off.

In this embodiment, the server receives the device information and target operation information of the target device sent by the terminal device, determines the control instruction corresponding to the target operation information according to the target operation information, and sends the control instruction to the target that the user needs to control, such that the target device is enabled to perform corresponding operations after receiving the control instruction, which realizes the effect of remote control of the IoT device by the user through the mouse, and improves the convenience and diversity of the control of the IoT device.

According to an exemplary embodiment, referring to FIG. 7 and FIG. 1, two overall architectures involved in the embodiment will be described first. The architecture shown in FIG. 1 is applied to the process of remotely controlling the IoT device through the mouse. The overall architecture has been described in detail in the previous embodiments, and will not be repeated here.

Figure 7:
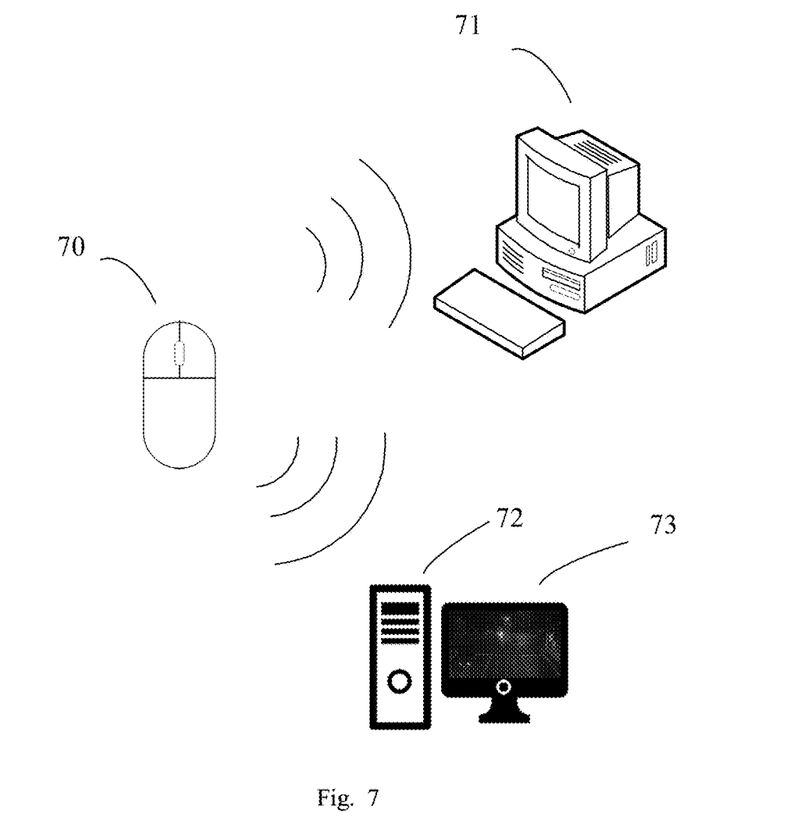
FIG. 7 is a diagram of a local communication network architecture for controlling non-networked devices with a method for controlling an Internet of Things (IoT) device according to an exemplary embodiment.

The architecture shown in FIG. 7 is applied to the process in which the mouse is used as a controller to control a local device. The local communication network includes a mouse 70 and a local device. The local device includes a computer 71 and an IoT device. The IoT device is an air conditioner 72 and a TV 73. The IoT device in this embodiment is a local device in a local communication network, that is, a non-networked device. A Bluetooth communication connection is established between the mouse 70 and the local device.

Figure 8:
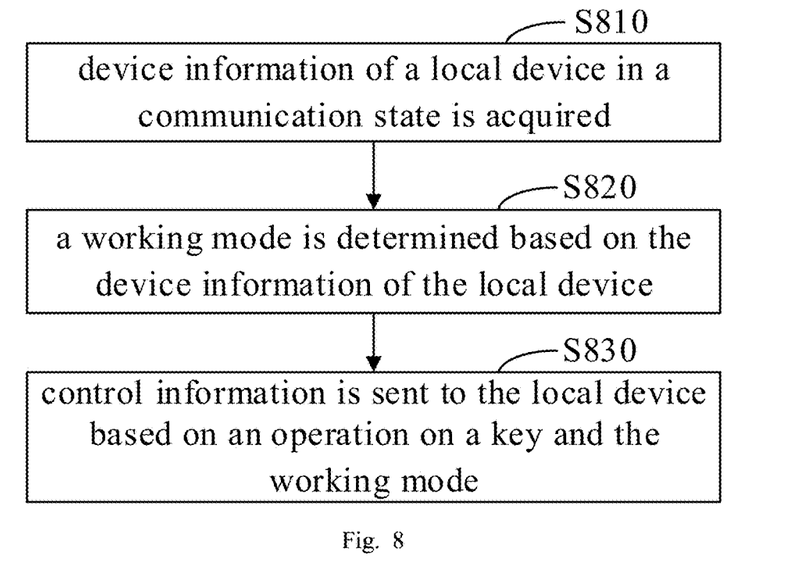
FIG. 8 is a flowchart showing a method of controlling an Internet of Things (IoT) device according to an exemplary embodiment.

As shown in FIG. 8, this embodiment provides a method for controlling an Internet of Things (IoT) device. The method is applied to the mouse 70 shown in FIG. 7. The method in this embodiment includes the following steps.

In step S810, device information of a local device in a communication state is acquired.

In this step, the mouse establishes Bluetooth communication with multiple local devices, and the user can send control information to the local device currently establishing a Bluetooth communication connection with the mouse by triggering the mouse key operation, and control the local device with which the Bluetooth connection is established. After receiving the operation information of the key from the user, the mouse sends different control information to the local device according to the different local devices connected to the mouse.

The device information represents what the device currently connected to the mouse is, such as the version number of the device, etc., and can reflect whether the device is a personal computer, a television, or an air conditioner.

In the implementation process, in order to facilitate the user to visually distinguish the information of the device currently establishing a communication connection with the mouse, an indicator can be set on the mouse, the local device currently connected can be determined by changing a blinking mode of the indicator, a color of the indicator, and the number of indicators and the like. For example, when the indicator is red, it means that the local device currently connected to the mouse is a computer; when there are two indicators are on, it indicates that the local device currently connected to the mouse is an air conditioner; when the indicator keeps flashing, it means that the local device currently connected with the mouse device is a TV. The above-mentioned specific method of displaying the local device currently connected with the mouse can be set in a custom way, so that the user can intuitively judge the current connected local device in a familiar method, which is convenient for the user to operate.

In step S820, a working mode is determined based on the device information of the local device.

In this step, after obtaining the device information of the local device, the mouse determines the working mode corresponding to the local device according to the device information of the local device. Specifically, the mouse can work in different working modes, the mouse has the working mode of a conventional mouse, and may also have other working modes. When the mouse is in different working modes, the user triggers the same mouse operation to send different control information, and then controls different local devices to perform different actions.

In step S830, control information is sent to the local device based on an operation on a key and the working mode.

In this step, the mouse receives the operation information corresponding to the mouse key that the user triggers, and accurately determines the control information sent by the user according to the local device corresponding to the control of the key operation and the working mode of the mouse corresponding to the local device, such that the control information is sent to the local device that the user wants to control, and the local device receives and executes the control information sent by the user.

Referring to FIG. 7, for example, when the mouse 70 currently establishes a communication connection with the computer 71, in the mouse working mode corresponding to the computer 71, and the user single clicks the left key, the parameter information is sent to the computer 71, and the parameter information includes the key value of the left key and the information of single click. At this time, after receiving the above-mentioned parameter information, the computer 71 makes a feedback of selecting a certain folder. For another example, when the mouse 70 currently establishes a communication connection with the TV 73, the mouse 70 is used as a controller of the TV 73, and when the user single clicks the left key, a control instruction of turning on the TV 73 is sent to the TV 73.

In this embodiment, different local devices can be controlled according to the different local devices to which the mouse is currently connected. That is, the mouse can be used as a normal mouse or as a controller, which expands the functional diversity of the mouse and improves the user experience.

Figure 9:
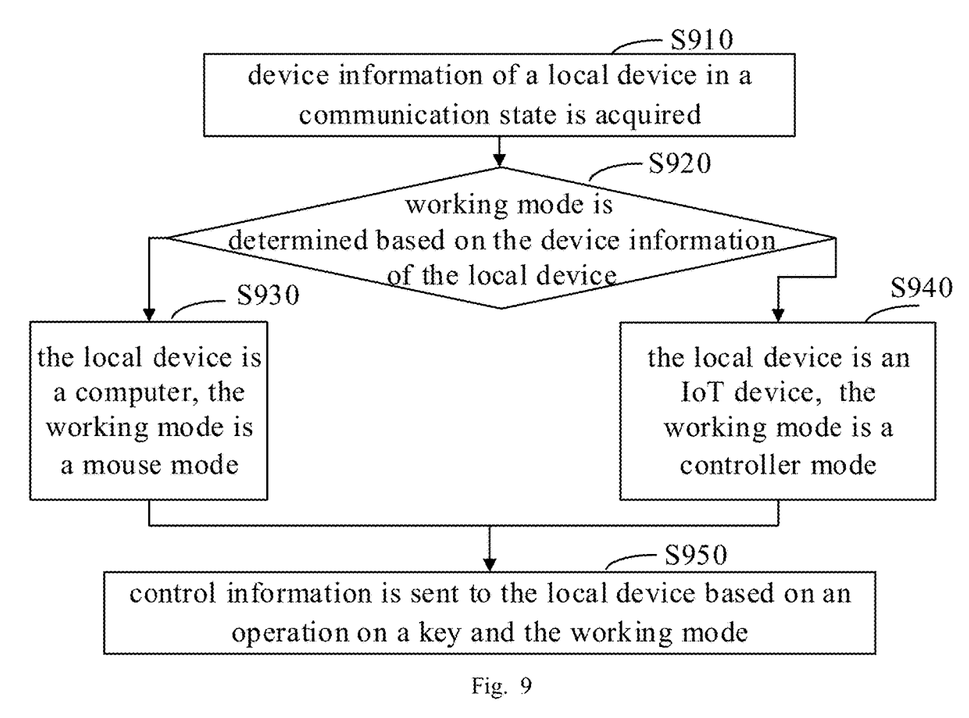
FIG. 9 is a flowchart showing a method of controlling an Internet of Things (IoT) device according to an exemplary embodiment.

According to an exemplary embodiment, referring to FIG. 7 and FIG. 9, this embodiment provides a method for controlling an Internet of Things (IoT) device, and the method is applied to a mouse. The method in this embodiment includes the following steps.

In step S910, device information of a local device in a communication state is acquired.

The step S910 is the same as the step S810, and the relevant description is mentioned in step S810, which will not be repeated in this embodiment.

In step S920, a working mode is determined based on the device information of the local device.

In this step, after acquiring the device information of the local device in the communication state, the mouse determines whether the local device to be controlled by the user is a computer or an IoT device according to the device information of the local device, so as to send the control information in the working mode of the computer or the IoT device, thereby distinguishing the local devices currently controlled by the user through the mouse and control them accordingly.

In step S930, it is determined that the working mode is a mouse mode in response to the device information of the local device representing that the local device is a computer.

In this step, after acquiring the device information of the local device, the mouse determines that the local device to be controlled by the user is the computer according to the device information of the local device, and determines that the working mode of the mouse corresponding to the computer is a mouse mode according to the configuration information of the mouse. Therefore, the mouse is enabled to send the control information sent by the user to the computer in the mouse mode, and the computer will process the control information sent by the user through the mouse. For example, users can manipulate files and folders on the computer by single-clicking, double-clicking, long-pressing, and dragging the mouse keys.

In step S940, it is determined that the working mode is a controller mode in response to the device information of the local device representing that the local device is the IoT device.

In this step, after acquiring the device information of the local device, the mouse determines that the local device to be controlled by the user is an air conditioner or a TV, etc. according to the device information of the local device, and it is determined that the working mode of the mouse is the controller mode, thereby facilitating the user's operation to send out correct control instructions to the air conditioner or TV in the controller mode, and the TV or the air conditioner is controlled to perform corresponding actions. For example, the air conditioner is controlled to be turned on or off, and the TV is controlled to be turned on or off.

In step S950, control information is sent to the local device based on an operation on a key and the working mode.

In this step, when the working mode is the controller mode, the control information is sent to the IoT device in a Bluetooth broadcasting manner according to the received key operation, in which the control information includes the Bluetooth secret key of the IoT device as the local device.

Since the Bluetooth communication method sends control information through broadcast, in order to ensure the accuracy and pertinence of control, the control information of the Bluetooth broadcast includes the Bluetooth secret key of the IoT device to be controlled, so as to ensure that only the IoT device who has the secret key can receive the control instruction and execute corresponding actions.

The Bluetooth secret key involved in the control information can be obtained by the mouse from the terminal device. The mouse can first establish a communication connection with the terminal device through Bluetooth. The terminal device stores configuration information and the Bluetooth secret key of the IoT device involved. The configuration information is used to represent the device information of the IoT device corresponding to the key value of the key and the operation information that acts on the IoT device corresponding to the state of the key. The user can customize the configuration information, adjust the IoT device corresponding to the key value of the mouse key, and the operation information corresponding to the state of the key to enhance the personalized configuration and functional diversity.

Of course, it should be understood that the Bluetooth secret key and configuration information can also be stored in the server instead of the terminal device. When the Bluetooth device and configuration information need to be used, the terminal device communicates with the server to obtain the Bluetooth secret key and configuration information.

In this embodiment, the mouse can be used as an ordinary mouse or as a controller to control local Internet of Things devices, which enhances the functional diversity of the mouse and facilitates local control by the user.

Figure 10:
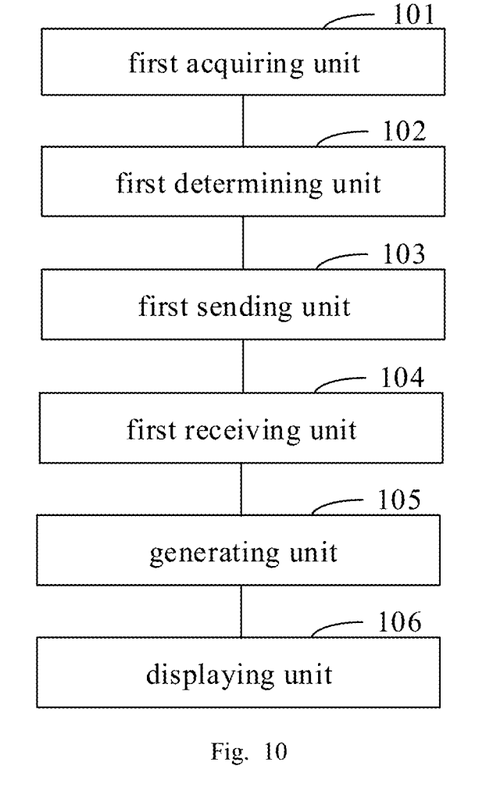
FIG. 10 is a block diagram showing an apparatus for controlling an Internet of Things (IoT) device according to an exemplary embodiment.

According to an exemplary embodiment, as shown in FIG. 10, the apparatus is applied to a terminal device. The apparatus includes a first acquiring unit 101, a first determining unit 102, a first sending unit 103, a first receiving unit 104, and a generating unit 105 and a displaying unit 106.

The first acquiring unit 101 is configured to acquire parameter information of a triggered key of a mouse, in which the parameter information includes a key value of the key and a state of the key. The first determining unit 102 is configured to determine a target device and target operation information acting on the target device based on the parameter information. The first sending unit 103 is configured to send device information of the target device and the target operation information to a server.

The first determining unit 102 is specifically configured to: acquire configuration information, in which the configuration information is configured to represent a correspondence between the key value of the key and the IoT device and a correspondence between the state of the key and operation information; and determine the target device and the target operation information acting on the target device based on the parameter information and the configuration information.

The apparatus also includes: a first receiving unit 104, is configured to receive customized information input to the terminal device, in which the customized information comprises device information of the IoT device corresponding to the key value of the key, and operation information of the IoT device corresponding to the state of the key; and a generating unit 105, configured to determine the configuration information based on the customized information.

The first obtaining unit 101 is configured to acquire authentication information of the mouse; the first determining unit 102 is configured to confirm that the mouse belongs to an authentication device according to the authentication information; and the apparatus also includes a displaying unit 106, which is configured to display device information of the mouse.

Figure 11:
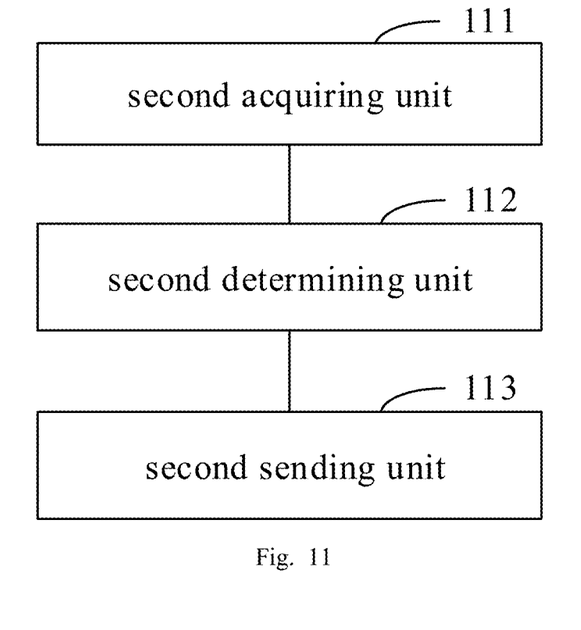
FIG. 11 is a block diagram showing an apparatus for controlling an Internet of Things (IoT) device according to an exemplary embodiment.

According to an exemplary embodiment, as shown in FIG. 11, the apparatus is applied to a server. Referring to FIG. 11, the apparatus includes a determining second acquiring unit 111, a second determining unit 112, and a second sending unit 113.

The second acquiring unit 111 is configured to acquire device information and target operation information of a target device sent by a terminal device. The second determining unit 112 is configured to determine a control instruction according to the target operation information. The second sending unit 113 is configured to send the control instruction to the target device.

Figure 12:
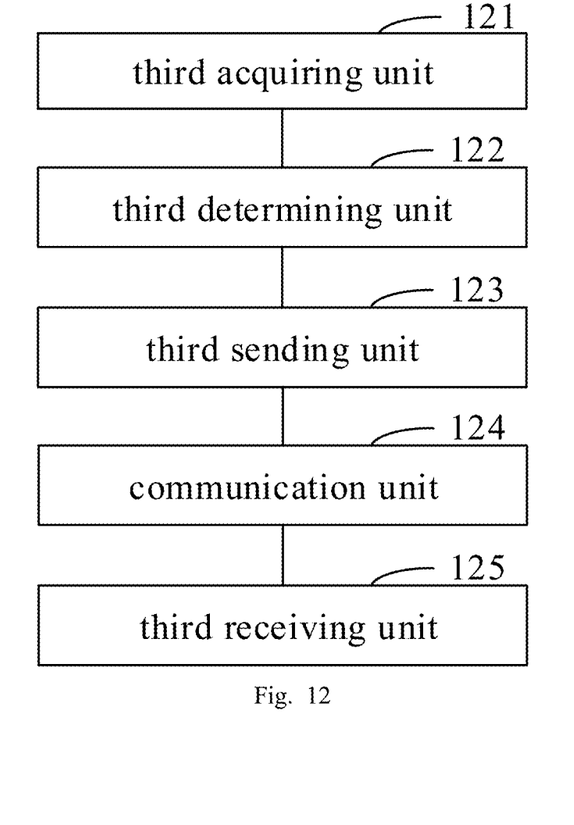
FIG. 12 is a block diagram showing an apparatus for controlling an Internet of Things (IoT) device according to an exemplary embodiment.

According to an exemplary embodiment, as shown in FIG. 12, the apparatus is applied to a mouse. Referring to FIG. 12, the device includes a third acquiring unit 121, a third determining unit 122, a third sending unit 123, a communication unit 124, and a third receiving unit 125.

The third acquiring unit 121 is configured to acquire device information of a local device in a communication state. The third determining unit 122 is configured to determine a working mode based on the device information of the local device. The third sending unit 123 is configured to send control information to the local device based on an operation on a key and the working mode.

The third determining unit 122 is further configured to: determine that the working mode is a mouse mode in response to the device information of the local device representing that the local device is a computer; and determine that the working mode is a controller mode in response to the device information of the local device representing that the local device is the IoT device.

The third sending unit 123 is configured to: send the control information to the IoT device in a Bluetooth broadcasting manner based on the operation on the key in a case that the working mode is the controller mode, wherein the control information comprises a Bluetooth key of the IoT device.

Among them, the apparatus also includes: a communication unit 124, configured to establish a communication connection with a terminal device; and a third receiving unit 125, configured to receive configuration information sent by the terminal device and the Bluetooth key of the IoT device, in which the configuration information is configured to represent device information of the IoT device corresponding to the key value of the key, and operation information acting on the IoT device corresponding to a state of the key.

Regarding the apparatus in the foregoing embodiment, the specific manner in which each unit performs operation has been described in detail in the embodiment of the method, and detailed description will not be given here.

An embodiment of the present disclosure provides a terminal device, including: a processor; a memory for storing instructions executable by the processor; in which the processor is configured to execute the instructions in the memory to implement the method for controlling an Internet of Things (IoT) device described above.

An embodiment of the present disclosure provides a server, including: a processor; a memory for storing instructions executable by the processor; in which the processor is configured to execute the instructions in the memory to implement the method for controlling an Internet of Things (IoT) device described above.

An embodiment of the present disclosure provides a mouse, including: a processor; a memory for storing instructions executable by the processor; in which the processor is configured to execute the instructions in the memory to implement the method for controlling an Internet of Things (IoT) device described above.

An embodiment of the present disclosure provides a system, including the terminal device, the server and the mouse in above embodiments.

Figure 13:
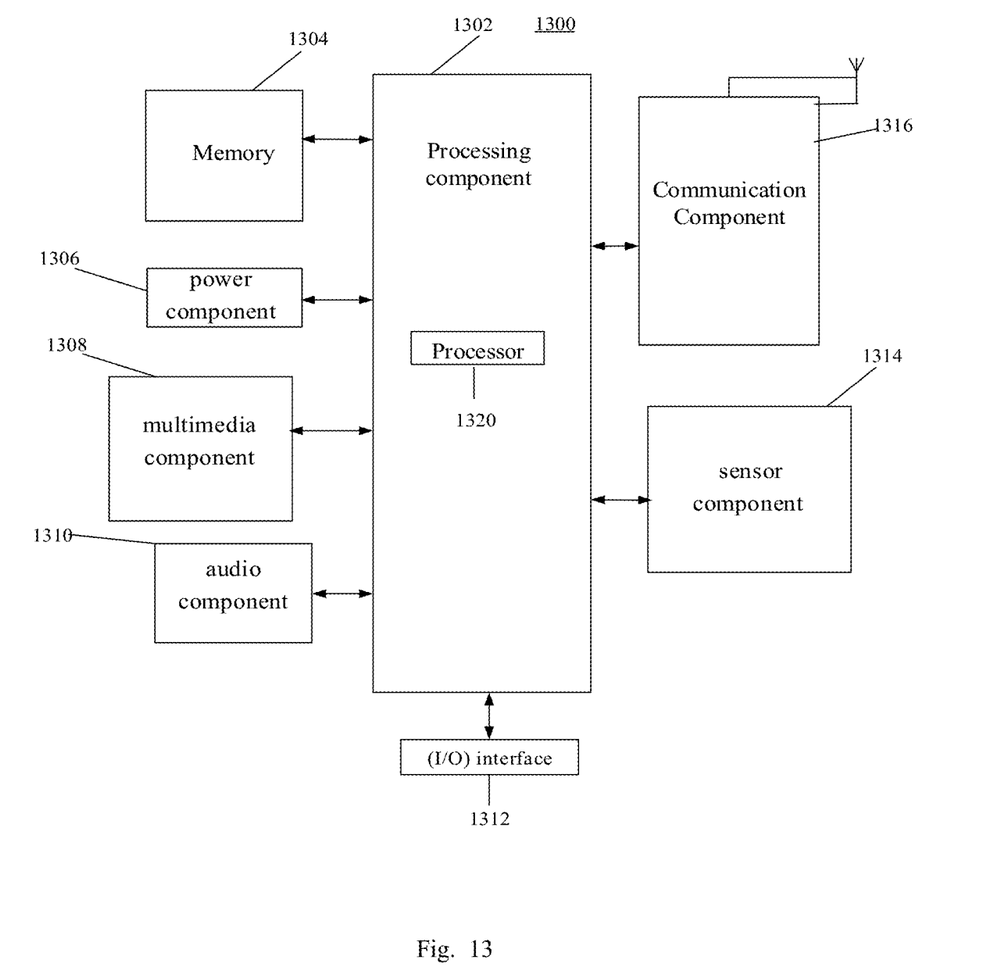
FIG. 13 is a block diagram showing an electronic device according to an exemplary embodiment.

FIG. 13 is a block diagram showing an electronic device according to an exemplary embodiment. For example, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the apparatus 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the apparatus 1300. Examples of such data include instructions for any applications or methods operated on the apparatus 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the apparatus 1300. The power component 1306 may include a power management system, one or more power sources, and any other components associated with the generation, management, and distribution of power in the apparatus 1300.

The multimedia component 1308 includes a screen providing an output interface between the apparatus 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front-facing camera and/or a rear-facing camera. When the apparatus 1300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1310 is configured to output and/or input audio signals. For example, the audio component 1310 includes a microphone (MIC) configured to receive an external audio signal when the apparatus 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, keys, and the like. The keys may include, but are not limited to, a home key, a volume key, a starting key, and a locking key.

The sensor component 1314 includes one or more sensors to provide status assessments of various aspects of the apparatus 1300. For instance, the sensor component 1314 may detect an open/closed status of the apparatus 1300, relative positioning of components, e.g., the display and the keypad, of the apparatus 1300, a change in position of the apparatus 1300 or a component of the apparatus 1300, a presence or absence of user contact with the apparatus 1300, an orientation or an acceleration/deceleration of the apparatus 1300, and a change in temperature of the apparatus 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the apparatus 1300 and other devices. The apparatus 1300 can access a wireless network based on a communication standard, such as WiFi, 2G, or 3G, or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1304, executable by the processor 1320 in the apparatus 1300, for performing the above-described methods. For example, the non-transitory computer-readable storage medium may be a ROM, a RAM, a CD-ROM, a magnetic tape, a floppy disc, an optical data storage device, and the like.

It is further understood that terms such as "first" and "second" are used to describe various information, but the information should not be limited to these terms. These terms are only used to distinguish the same type of information from each other, and do not indicate a specific order or importance. In fact, the expressions "first" and "second" may be used interchangeably. For example, without departing from the scope of the present disclosure, the first information may also be referred to as the second information, and similarly, the second information may also be referred to as the first information.

It is further understood that unless otherwise specified, "connection" means that there is no direct connection between the two with other components, and there is an indirect connection between the two with other elements.

It is further understood that although the operations are described in a specific order in the drawings in the embodiments of the present disclosure, it should not be construed as requiring that the operations are performed in the specific order shown or in a serial order, or performed all to get the desired result. In certain environments, multitasking and parallel processing may be advantageous.

It should be further understood that, when used in the specification, terms "comprising" and/or "containing" specify the presence of stated features, operations, elements and/or components, but do not exclude the presence or addition of one or more other features, operations, elements, components and/or groups thereof. If there are no more restrictions, the element defined by the sentence "including a . . . " does not exclude the existence of other identical elements in the process, method, article, or device that includes the element.

Detail descriptions of the apparatus in embodiments above are described in the method embodiments, which will not be described in detail herein.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A method for controlling an Internet of Things (IoT) device, applied to a terminal device, comprising:
   acquiring parameter information of a triggered key of a mouse, wherein the parameter information includes a key value of the key and a state of the key;
   determining a target device and target operation information acting on the target device based on the parameter information; and
   sending device information of the target device and the target operation information to a server;
   wherein determining the target device and the target operation information acting on the target device based on the parameter information comprises:
   acquiring configuration information, wherein the configuration information is configured to represent a correspondence between the key value of the key and the IoT device and a correspondence between the state of the key and operation information; and
   determining the target device and the target operation information acting on the target device based on the parameter information and the configuration information;
   wherein different keys of the mouse respectively correspond to different target IoT devices; for each key, different states of the key respectively correspond to different target operation information for controlling the target IoT device to realize different functions; and
   wherein determining a target device and target operation information acting on the target device based on the parameter information comprises: in response to receiving a trigger acted on a certain key of the mouse, determining the target IoT device based on the key value of the certain key, and determining target operation information based on the state of the key corresponding to the trigger, such that the target operation information is configured to control the target IoT device.

2. The method of claim 1, further comprising:
   receiving customized information input to the terminal device, wherein the customized information comprises device information of the IoT device corresponding to the key value of the key, and operation information of the IoT device corresponding to the state of the key; and
   determining the configuration information based on the customized information.

3. The method of claim 1, further comprising:
   acquiring authentication information of the mouse;
   confirming that the mouse belongs to an authentication device according to the authentication information; and
   displaying device information of the mouse.

4. The method of claim 1, wherein the server is configured to:
   acquire the device information and the target operation information of the target device sent by the terminal device;
   determine a control instruction according to the target operation information; and
   send the control instruction to the target device.

5. The method of claim 1, wherein the key value of a left key of the mouse corresponds to a first IoT device, the key value of a right key of the mouse corresponds to a second IoT device, and the key value of a middle key of the mouse corresponds to a third IoT device.

6. A non-transitory computer-readable medium having instructions stored thereon for execution by a processing circuit to implement operations of the method according to claim 1.

7. A terminal device, comprising:
   a processor;
   a memory for storing instructions executable by the processor;

wherein the processor is configured to:

acquire parameter information of a triggered key of a mouse, wherein the parameter information includes a key value of the key and a state of the key;

determine a target device and target operation information acting on the target device based on the parameter information; and send device information of the target device and the target operation information to a server;

wherein the processor is configured to: acquire configuration information, wherein the configuration information is configured to represent a correspondence between the key value of the key and the IoT device and a correspondence between the state of the key and operation information; and determine the target device and the target operation information acting on the target device based on the parameter information and the configuration information;

wherein different keys of the mouse respectively correspond to different target IoT devices; for each key, different states of the key respectively correspond to different target operation information for controlling the target IoT device to realize different functions; and wherein the processor is configured to: in response to receiving a trigger acted on a certain key of the mouse, determine the target IoT device based on the key value of the certain key, and determine target operation information based on the state of the key corresponding to the trigger, such that the target operation information is configured to control the target IoT device.

8. The terminal device of claim 7, wherein the processor is configured to:

receive customized information input to the terminal device, wherein the customized information comprises device information of the IoT device corresponding to the key value of the key, and operation information of the IoT device corresponding to the state of the key; and determine the configuration information based on the customized information.

9. The terminal device of claim 7, wherein the processor is configured to:

acquire authentication information of the mouse;

confirm that the mouse belongs to an authentication device according to the authentication information; and display device information of the mouse.

\* \* \* \* \*